United States Patent [19]

Alford et al.

[11] Patent Number: 4,544,726
[45] Date of Patent: Oct. 1, 1985

[54] EMULSION POLYMERIZATION EMULSIFIER

[75] Inventors: John A. Alford, Goose Creek; Carlton G. Force, Mt. Pleasant, both of S.C.; John W. Gowan, Jr., Columbia, Md.

[73] Assignee: Westvaco Corporation, New York, N.Y.

[21] Appl. No.: 657,233

[22] Filed: Oct. 3, 1984

[51] Int. Cl.$^4$ ............................................. C08F 36/00
[52] U.S. Cl. ................................... 526/309; 526/213; 526/216
[58] Field of Search ........................ 526/213, 216, 309

[56] References Cited

U.S. PATENT DOCUMENTS

| | | | |
|---|---|---|---|
| 2,245,131 | 6/1940 | Hermann et al. | 526/75 |
| 2,300,056 | 10/1942 | Meis et al. | 260/23 |
| 3,711,437 | 1/1973 | Wieland et al. | 260/29.7 |
| 3,753,968 | 8/1973 | Ward | 260/97.6 |
| 4,259,459 | 3/1981 | Force | 525/154 |
| 4,450,260 | 5/1984 | Von Bodungen et al. | 526/213 |

OTHER PUBLICATIONS

J. W. Wilson et al., "Soap Ingredients as Retarders in Butadiene Copolymerization," *Industrial and Engineering Chemistry,* vol. 40, No. 3, (Mar. 1948), p. 530.

*Organic Synthesis,* Collective vol. 4, John Wiley & Sons, Inc., (1963), p. 977.

B. W. Greene et al., "In Situ Polymerization of Surface-Active Agents on Latex Particles," *Journal of Colloid and Interface Science,* vol. 32, No. 1, (Jan. 1970), p. 90.

*Primary Examiner*—Paul R. Michl
*Assistant Examiner*—A. H. Walker
*Attorney, Agent, or Firm*—Terry B. McDaniel; Richard L. Schmalz

[57] ABSTRACT

Disclosed as an emulsion polymerization emulsifier is a half vinyl ester of $C_{21}$-dicarboxylic acid of the general formula

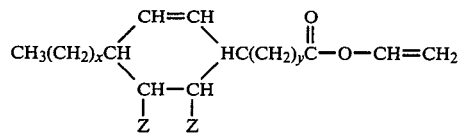

wherein x and y are integers from 3 to 9, x and y together equal 12, one Z is COOH and the other Z is hydrogen. The emulsifier may be blended as a mixture with disproportionated fatty acids and/or $C_{21}$-dicarboxylic acid.

10 Claims, No Drawings

EMULSION POLYMERIZATION EMULSIFIER

BACKGROUND OF THE INVENTION

(1) Field of the Invention

The present invention relates to emulsion polymerization emulsifiers, methods of preparing the emulsifiers and latex compositions comprising the novel emulsifiers. The present invention more particularly relates to novel emulsion polymerization emulsifiers described as the half vinyl esters of $C_{21}$-dicarboxylic acid of the formula

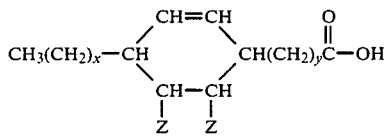

wherein x and y are integers from 3 to 9, x and y together equal 12, one Z is COOH and the other Z is hydrogen.

(2) Description of the Prior Art

Emulsion polymerization is one of several methods for effecting the process of addition polymerization. The monomer is emulsified in a medium, generally water, with the aid of micelle generating substances, or emulsifying agents, such as soaps, alkyl sulfonates, etc. In addition to the monomer, water (as the continuous phase) and emulsifier, the process requires an initiator. Hydrogen peroxide and ammonium peroxysulfate are examples of such initiators.

One of the principal advantages of emulsion polymerization is the possibility of formation of a polymer of high molecular weight at a very high rate of polymerization. In this respect emulsion polymerization stands alone among techniques of free radical polymerization. Thus, this process has gained widespread commercial acceptance.

Meis and Werk, in U.S. Pat. No. 2,300,056 developed emulsifiers for emulsion polymerization from mixtures of (a) water soluble surface active emulsifying agents and (b) water soluble salts of unsaturated carboxylic acids the esters of which represent drying oils, particularly alkali metal salts.

Force, a co-inventor in this application, disclosed acid-catalyzed, formaldehyde-treated mixtures of tall oil fatty and resin acids as emulsion polymerization emulsifiers in U.S. Pat. No. 4,259,459. Also, in *Emulsion Polymerisation, Theory and Practice* (1975), at Chapter 7, Blackley discusses the use of various fatty acid soaps and rosin acid soaps as micelle generating substances. Of considerable concern, however, is the effect upon polymerization which may be caused by adventitious impurities in the fatty acid or rosin acid soap used, particularly soaps derived from unsaturated fatty acids. Wilson et al. reported in *Industrial Engineering Chemistry* (1948), Vol. 40, p. 530, that soaps derived from linoleic and linolenic acids retard the copolymerization of styrene and butadiene. Naturally, the emulsifier also should not disturb the physical properties of the polymer.

A major concern for producers and consumers of certain polymer products is the migration of emulsifier from the polymer. In some cases the result is merely a visual or aesthetic problem; in other cases, the result can be more dramatic, as with hoses for gasoline and other fuels. For those end uses where migration of emulsifier is of concern, two approaches can be taken to minimize problems: (1) washing the emulsifier from the latex before further converting operations or (2) polymerizing the emulsifier into the polymer so that the emulsifier is permanently bound.

The first approach is commonly used but results in increased cost due to added operational steps. The second approach is less commonly used because such emulsifiers typically are very expensive and have limited scope primarily due to low polymerization activity.

Greene et al., in "In Situ Polymerization of Surface-Active Agents on Latex Particles," in *Journal of Colloid and Interface Science*, Vol 32, p. 90 (1970), disclose the sodium salt of 9- (and 10-) acrylamidostearic acid as a polymerizable micelle generator for a 60/40 styrene-butadiene copolymer. It is reported that the in situ polymerized soap is more efficient in conferring mechanical stability than is an added monomeric soap, as long as the surface coverage exceeds 20%.

An object of the present invention, therefore, is to provide a novel latex composition from which, upon polymerization, the emulsion polymerization emulsifier will not migrate. A further object of this invention is to provide a polymerizable emulsifier for use in an emulsion polymerization process which, upon polymerization, will be permanently bound. Also, an object of this invention is to provide an emulsifier which neither inhibits polymerization nor adversely affects the polymer physical properties. A still further object of this invention is to provide a polymerizable emulsifier which is relatively inexpensive compared to known polymerizable emulsifiers.

SUMMARY OF THE INVENTION

All of the above objects are met in the discovery that incorporation of the emulsifier molecule into the polymer can be achieved when the emulsion polymerization emulsifier is a half vinyl ester of the $C_{21}$-dicarboxylic acid of the formula

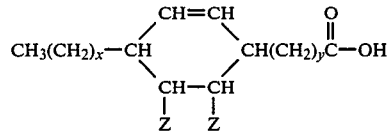

wherein x and y are integers from 3 to 9, x and y together equal 12, one Z is COOH and the other Z is hydrogen. The preferred emulsifier is the half vinyl ester of the $C_{21}$-dicarboxylic acid of the following formula

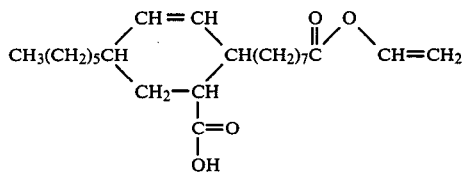

The preferred emulsifier may be employed as a blend of the diacid half vinyl ester with a mixture of disproportionated fatty acids and/or $C_{21}$-dicarboxylic acid.

DESCRIPTION OF THE PREFERRED EMBODIMENT

The essence of this invention is the discovery that when a mixture of a $C_{21}$-cycloaliphatic dicarboxylic acid, which is predominantly 5 carboxy-4-hexyl-2 cyclohexene-1-octanoic acid, is reacted with vinyl acetate, the isomer mixture product acts as an effective emulsion polymerization emulsifier. The mixture of these isomers is represented by the general formula:

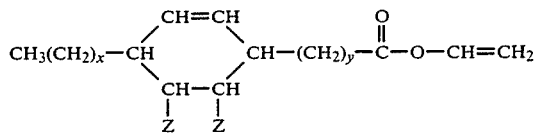

wherein x and y are integers from 3 to 9, x and y together equal 12, one Z is COOH and the other Z is hydrogen. Although the isomers wherein x is 5 and y is 7 form a preponderance of the composition, there are minor amounts of the half vinyl ester of $C_{21}$-dicarboxylic acid where the cyclohexene ring varies in position along the carbon chain. For the purpose of this specification, compositions of the general formulation shown above are termed "half vinyl esters of $C_{21}$-dicarboxylic acids" or "diacid half vinyl esters."

The $C_{21}$-dicarboxylic acids used in this invention are produced from linoleic acid of various animal, vegetable and tall oil sources. The $C_{21}$-dicarboxylic acids may be made by reacting linoleic acid with acrylic acid and catalytic amounts of iodine. One such process for making the $C_{21}$-dicarboxylic acids for use in the esters of this invention is set forth in U.S. Pat. No. 3,753,968 entitled "Selective Reaction of Fatty Acids and Their Separation."

The synthesis of the diacid vinyl esters was carried out according to the method described in *Organic Synthesis* (1963), Collective Volume 4, p. 977. This process involves combining the $C_{21}$-dicarboxylic acid and vinyl acetate in the presence of mercuric acetate. The process relies on the interaction of the mercuric acetate to give high conversion to the ester. The reaction sequence for one isomer of the diacid can be described as follows:

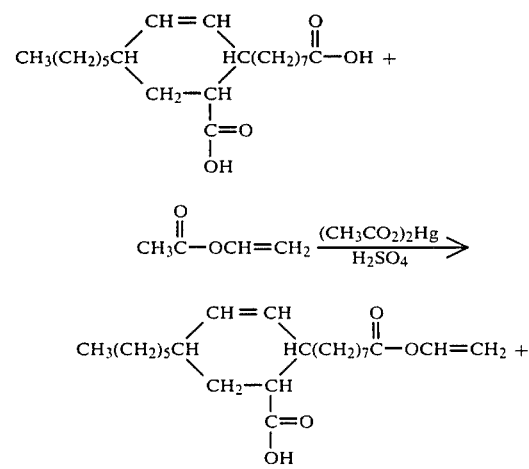

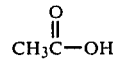

Vinyl esters of the $C_{21}$-dicarboxylic acid may also be prepared by reaction with acetylene, but this reaction is not as convenient for small-scale laboratory preparations.

The emulsion polymerization emulsifiers of this invention are further described in the following examples:

EXAMPLE 1

Vinyl acetate, in an amount of 103 g (1.2 moles), and 71.2 g (0.2 mole) $C_{21}$-dicarboxylic acid were combined under nitrogen in a 250 ml round-bottomed three-necked flask fitted with reflux condenser, thermometer and gas inlet. The diacid dissolved on warming and shaking. Mercuric acetate was added in an amount of 0.8 g, and the reaction mixture was stirred with a magnetic stirrer for thirty minutes. Two drops of 100% sulfuric acid were added. (100% sulfuric acid was prepared by carefully combining 10 ml 95% $H_2SO_7$ and 7.3 ml 20% fuming sulfuric acid.) The reaction was heated to reflux and stirred. After three hours, the heat was removed; and stirring was continued overnight. Sodium acetate, in an amount of 0.56 g, was added to neutralize the sulfuric acid; and the unreacted vinyl acetate was removed in vacuo. The reaction product was diluted with 100 ml cyclohexane, washed twice with 25 ml saturated sodium chloride. Finally, the product was dried over anhydrous sodium sulfate and the solvent evaporated in vacuo.

Thin layer chromatography was relied on for analysis of the product. On either silica gel (9/1, $CHCl_3$/methanol) or $C_{18}$ reverse phase plates (9/1, acetonitrile/water) separation is excellent, and assessment of the progress of the reaction is straightforward. The chromatograms indicated the desired half vinyl ester of $C_{21}$-dicarboxylic acid was achieved.

EXAMPLE 2

In order to evolute the polymerization rates using the invention emulsifier and the particle size and size distribution of the polymers as compared to that obtained with standard emulsifiers, styrene-butadiene polymerizations were performed using the product of the synthesis of Example 1, both alone and in combination with fatty acid emulsifiers (disproportionated mixtures of tall oil fatty acids). The standard emulsifier, described as "plant mix," is a blended rosin acid-partially hydrogenated tallow fatty acid emulsifier. The performance of the invention emulsifier is also compared to unmodified $C_{21}$-dicarboxylic acid. The results of these polymerizations are shown in Table I.

TABLE I

| Run | Emulsifier | 6 Hour Conversion (%) | Particle Characteristics (Average) | |
|---|---|---|---|---|
| | | | Diameter (Angstroms) | Distribution (Angstroms) |
| 1. | Plant Mix | 56 | 562 | 128 |
| | $C_{21}$—Dicarboxylic Acid | 40 | 578 | 137 |
| | Diacid Half Vinyl Ester | 28 | 680 | 133 |
| | Diacid Half Vinyl Ester/1483* (1/1) | 47 | 555 | 167 |
| 2. | Plant Mix | 55 | 508 | 166 |
| | $C_{21}$—Dicarboxylic Acid | 45 | 521 | 91 |
| | Diacid Half Vinyl Ester | 43 | 527 | 139 |

TABLE I-continued

| Run | Emulsifier | 6 Hour Conversion (%) | Particle Characteristics (Average) Diameter (Angstroms) | Distribution (Angstroms) |
|---|---|---|---|---|
| | Diacid Half Vinyl Ester/1480** (4/1) | 46 | 526 | 133 |
| | Diacid Half Vinyl Ester/1480 (1/1) | 51 | 516 | 136 |
| 3. | Plant Mix | 56 | 512 | 158 |
| | $C_{21}$—Dicarboxylic Acid | 40 | 517 | 124 |
| | Diacid Half Vinyl Ester | 41 | 517 | 130 |
| | Diacid Half Vinyl Ester/1480 (4/1) | 45 | 533 | 139 |
| | Diacid Half Vinyl Ester/1480 (1/1) | 51 | 522 | 152 |

*Westvaco ® 1483 - commercial disporprtionated tall oil fatty acids
**Westvaco ® 1480 - commercial disproportionated tall oil fatty acids Table I shows that indeed polymerization is supported by the ester but that the rate of polymerization is slightly inhibited. The particle diameter and distribution, as indicators of molecular weight distribution, indicate some changes compared with the plant mix and with the diacid when those materials are used as emulsifiers. On mixing the diacid half vinyl ester with disproportionated tall oil fatty acids, however, the slightly depressed polymerization rates can be corrected with a concomitant improvement in particle properties.

Additionally, latex from totally polymerized samples was dissolved into a suitable solvent and examined for molecular weight distribution by thin layer chromatography. The method involves gradient elution in an increasingly chloroform rich mobile phase. The main observable difference is an apparent decrease in low molecular weight polymers. No new molecular weight species, relative to plant mix, were observed.

EXAMPLE 3

Polymerizations were also carried out in butadiene acrylonitrile systems. These polymerizations showed the same type of results although to a much less pronounced degree. See Table II.

TABLE II

| Run | Emulsifier | 6 Hour Conversion (%) | Particle Characteristics (Average) Diameter (Angstroms) | Distribution (Angstroms) |
|---|---|---|---|---|
| 4. | Plant Mix | 87 | 550 | 150 |
| | $C_{21}$—Dicarboxylic Acid | 81 | 624 | 152 |
| | Diacid Half Vinyl Ester | 76 | 627 | 137 |
| | Diacid Half Vinyl Ester/1480* (4/1) | 80 | 609 | 156 |
| | Diacid Half Vinyl Ester/1480 (1/1) | 87 | 577 | 145 |
| 5. | Plant Mix | 90 | 575 | 161 |
| | $C_{21}$—Dicarboxylic Acid | 82 | 638 | 172 |
| | Diacid Half Vinyl Ester | 83 | 623 | 152 |
| | Diacid Half Vinyl Ester/1480 (4/1) | 87 | 603 | 149 |
| | Diacid Half Vinyl Ester/1480 (1/1) | 91 | 617 | 202 |
| 6. | Plant Mix | 93 | 544 | 166 |
| | Diacid Half Vinyl Ester | 83 | 651 | 162 |
| | Diacid Half Vinyl Ester | 82 | 593 | 123 |

*Westvaco ® 1480 - commercial disproportionated tall oil fatty acids

The polymerizations proceeded to a much higher conversion at six hours due to the nature of the monomers. Their higher reactivity may have contributed to overcoming the inhibitory effects of the half vinyl ester. Again, the use of blends of the ester and fatty acids seemed to alleviate any negative impact of the material.

EXAMPLE 4

To determine the extent of polymerization of the half vinyl ester into the polymers, serum replacement techniques were used to detect unpolymerized emulsifier in the latex serum. In this method latex is placed into a filtering device fitted with a 0.5 μm pore size filter. Water is pumped in under pressure; and the filtrate is collected, dried and analyzed by thin layer chromatography. Table III shows the results obtained on styrene butadiene latices treated in this manner.

TABLE III

| Original Emulsifier | Emulsifier in Serum |
|---|---|
| Plant Mix | Rosin and Fatty Acids |
| $C_{21}$—Dicarboxylic Acid | $C_{21}$—Dicarboxylic Acid |
| Diacid Half Vinyl Ester | $C_{21}$—Dicarboxylic Acid |
| Diacid Half Vinyl Ester + 1483* (4/1) | Fatty Acid and Small Amount Fatty Acid |

*Westvaco ® 1483 - commercial disproportionated tall oil fatty acids

Since no diacid half vinyl ester was detected in the serum analysis either when used alone or in combination with the disproportionated fatty acid mixture, the diacid half vinyl ester is presumed to have been incorporated into the polymer. The diacid discovered in the sera when the diacid half vinyl ester was used alone as the emulsifier could have resulted from either the residual diacid in the ester or from hydrolysis of the ester. The former is more strongly suspected than the latter.

EXAMPLE 5

To further prove that the diacid half vinyl ester was actually incorporated into the polymer, solvent extractions of the latex were conducted. Experiments of this type were carried out on both styrene-butadiene and butadiene-acrylonitrile latices. In these experiments the system was carried to essentially complete conversion. The latex was coagulated with aluminum sulfate solution and extracted with either methanol or hexane. Analysis of the concentrated extracts, again by thin layer chromatography, revealed the type of material extracted. These analyses are reported in Tables IV and V.

TABLE IV

EMULSIFIERS EXTRACTED FROM COAGULATED STYRENE-BUTADIENE LATEX

| Run | Emulsifier | Extraction Solvent | Extracted Material |
|---|---|---|---|
| 1. | Plant Mix | Methanol | Fatty and Rosin Acids |
| | $C_{21}$—Dicarboxylic Acid | Methanol | $C_{21}$—Dicarboxylic Acid |
| | Diacid Half Vinyl Ester | Methanol | $C_{21}$—Dicarboxylic Acid |
| | Diacid Half Vinyl Ester/1483* (4/1) | Methanol | Fatty Acids |
| 2. | Plant Mix | Hexane | Fatty and Rosin Acids |
| | $C_{21}$—Dicarboxylic Acid | Hexane | $C_{21}$—Dicarboxylic Acid |
| | Diacid Half Vinyl Ester | Hexane | $C_{21}$—Dicarboxylic Acid |
| | Diacid Half Vinyl Ester/1483 (4/1) | Hexane | Fatty Acids |

*Westvaco ® 1483 - commercial disproportionated tall oil fatty acids

TABLE V
EMULSIFIERS EXTRACTED FROM COAGULATED ACRYLONITRILE-BUTADIENE LATEX

| Run | Emulsifier | Extraction Solvent | Extracted Material |
|---|---|---|---|
| 1. | Plant Mix | Methanol | Fatty and Rosin Acids |
|    | $C_{21}$—Dicarboxylic Acid | Methanol | $C_{21}$—Dicarboxylic Acid |
|    | Diacid Half Vinyl Ester | Methanol | $C_{21}$—Dicarboxylic Acid |
| 2. | Plant Mix | Hexane | Fatty and Rosin Acids |
|    | $C_{21}$—Dicarboxylic Acid | Hexane | $C_{21}$—Dicarboxylic Acid |
|    | Diacid Half Vinyl Ester | Hexane | $C_{21}$—Dicarboxylic Acid |

Diacid half vinyl ester was seen as only a very minor component or not at all in the extracts of coagulated latices. The ease with which other fatty acids and rosin acids were extracted indicated that if there were any diacid half vinyl ester free in the latex mixture that it should have been extracted. Therefore, one can conclude with a higher degree of assurance that the material was permanently bound into the polymer.

The half vinyl ester of diacid has been demonstrated as a viable emulsifier for emulsion polymerizations. The use of small amounts of fatty acids with the $C_{21}$-dicarboxylic acid derivative improves conversion rates and particle diameters. Several pieces of evidence, i.e., serum replacement, methanol and hexane extraction of coagulated latex, and impact on polymerization, show incorporation of the molecule via its vinyl group into polymers.

It will be understood that the foregoing examples and explanation are for illustrative purposes only, and that the present invention includes numerous modifications which will be self-evident to those skilled in the art. Accordingly, the invention is not to be limited save as is consonant with the following claims.

What is claimed is:

1. In an emulsion polymerization process comprising combining monomer, emulsifier, initiator and water as the continuous phase, the improvement wherein the emulsifier is a half vinyl ester of $C_{21}$-dicarboxylic acid of the general formula

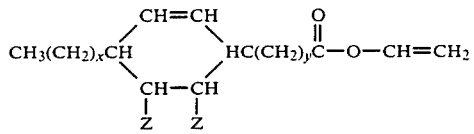

wherein x and y are integers from 3 to 9, x and y together equal 12, one Z is COOH and the other Z is hydrogen.

2. The process of claim 1 wherein the monomer is a mixture of styrene and butadiene.

3. The process of claim 1 wherein the monomer is a mixture of acrylonitrile and butadiene.

4. The process of claim 1 wherein x equals 5 and y equals 7.

5. The process of claim 1 wherein the emulsifier is a mixture comprising the emulsifier of claim 1 and a member of the group consisting of disproportionated fatty acids and $C_{21}$-dicarboxylic acid.

6. The process of claim 5 wherein the disproportionated fatty acids are derived from tall oil.

7. A composition of matter of the general formula

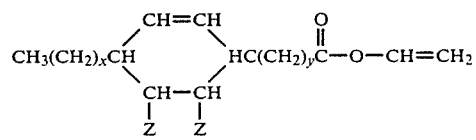

wherein x and y are integers from 3 to 9, x and y together equal 12, one Z is COOH and the other Z is hydrogen.

8. The composition of matter of claim 7 wherein x equals 5 and y equals 7.

9. A latex composition comprising a half vinyl ester of $C_{21}$-dicarboxylic acid of the general formula

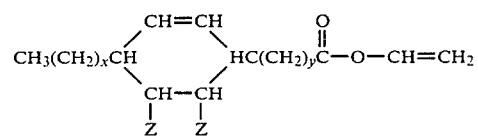

wherein x and y are integers from 3 to 9, x and y together equal 12, one Z is COOH and the other Z is hydrogen.

10. The latex composition of claim 9 wherein x equals 5 and y equals 7.

* * * * *